(12) United States Patent
Williams et al.

(10) Patent No.: US 11,772,587 B2
(45) Date of Patent: Oct. 3, 2023

(54) VEHICLES WITH ONE OR MORE PROGRAMMABLE CONNECTION PORTS

(71) Applicant: Toyota Motor Engineering & Manufacturing North America, Inc., Plano, TX (US)

(72) Inventors: Clinton J. Williams, Saline, MI (US); Aaron Weidenaar, Ann Arbor, MI (US); John Charles Rafferty, Dexter, MI (US); Lou M. Pope, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 722 days.

(21) Appl. No.: 16/791,338

(22) Filed: Feb. 14, 2020

(65) Prior Publication Data
US 2021/0253049 A1    Aug. 19, 2021

(51) Int. Cl.
| | |
|---|---|
| *B60R 16/033* | (2006.01) |
| *B60N 2/00* | (2006.01) |
| *G01K 13/00* | (2021.01) |
| *G06F 13/40* | (2006.01) |
| *B62D 25/14* | (2006.01) |
| *B60R 16/03* | (2006.01) |

(52) U.S. Cl.
CPC ............ *B60R 16/033* (2013.01); *B60N 2/002* (2013.01); *B60R 16/03* (2013.01); *B62D 25/14* (2013.01); *G01K 13/00* (2013.01); *G06F 13/4068* (2013.01)

(58) Field of Classification Search
CPC ....... B60R 16/03; B60R 16/033; B60N 2/002; B62D 25/14; G01K 13/00; G06F 13/4068
USPC ................. 307/9.1, 10.1; 713/320; 320/104
See application file for complete search history.

(56) References Cited

U.S. PATENT DOCUMENTS

| | | | |
|---|---|---|---|
| 7,701,167 B2 | 4/2010 | Yamaguchi | |
| 9,610,844 B2 | 4/2017 | Cho et al. | |
| 10,279,758 B2 | 5/2019 | Yoneyama et al. | |
| 10,292,004 B2 | 5/2019 | Xie et al. | |
| 11,030,833 B2 * | 6/2021 | Winiecki | H01M 10/48 |
| 2012/0316702 A1 * | 12/2012 | Liu | G01C 21/3688 |
| | | | 701/2 |
| 2015/0028668 A1 * | 1/2015 | Smith | B60R 16/0238 |
| | | | 307/9.1 |
| 2018/0022299 A1 | 1/2018 | Han et al. | |

FOREIGN PATENT DOCUMENTS

| | | |
|---|---|---|
| CN | 206826568 U | 1/2018 |
| JP | 3994832 B2 | 8/2007 |

* cited by examiner

*Primary Examiner* — Arnold M Kinkead
(74) *Attorney, Agent, or Firm* — Dinsmore & Shohl LLP

(57) ABSTRACT

A vehicle includes a battery, one or more programmable connection ports electrically coupled to the battery, and an electronic controller communicatively coupled to the one or more programmable connection ports. The electronic controller receives a user control signal from a user input device communicatively coupled to the electronic controller, wherein the user control signal indicates a threshold of operation, and selectively operates the one or more programmable connection ports in response to the threshold of operation indicated by the user control signal from the user input device.

13 Claims, 4 Drawing Sheets

VEHICLES WITH ONE OR MORE PROGRAMMABLE CONNECTION PORTS

TECHNICAL FIELD

The present specification generally relates to vehicles and, more specifically, vehicles with one or more programmable connection ports.

BACKGROUND

Vehicles often include USB plugs and/or 12V ports for mounting in-vehicle accessories. However, such ports are not typically intended for more permanent fixtures that may be added to the vehicle after-market (e.g., auxiliary lights, refrigerators, CB radios, air compressors, etc.) Additionally, such ports are not typically programmable to allow a user to set certain thresholds of operation. That is, while a user may turn an accessory on/off, by simply plugging/unplugging the accessory, a user may not customize or automate times of activation of an accessory.

Accordingly, a need exists for alternative vehicles with one or more programmable connection ports to allow vehicle owners further customization capabilities.

SUMMARY

In one embodiment, a vehicle includes a battery, one or more programmable connection ports electrically coupled to the battery, and an electronic controller communicatively coupled to the one or more programmable connection ports. The electronic controller receives a user control signal from a user input device communicatively coupled to the electronic controller, wherein the user control signal indicates a threshold of operation, and selectively operates the one or more programmable connection ports in response to the threshold of operation indicated by the user control signal from the user input device.

In another embodiment, a vehicle includes a dashboard separating a passenger compartment from an engine compartment of the vehicle, a battery, one or more programmable connection ports electrically coupled to the battery, wherein at least a portion of the one or more programmable connection ports are located behind the dashboard, and an electronic controller communicatively coupled to the one or more programmable connection ports. The electronic controller receives a user control signal from a remote device communicatively coupled to the electronic controller, and selectively operates the one or more programmable connection ports in response to the user control signal from the remote device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
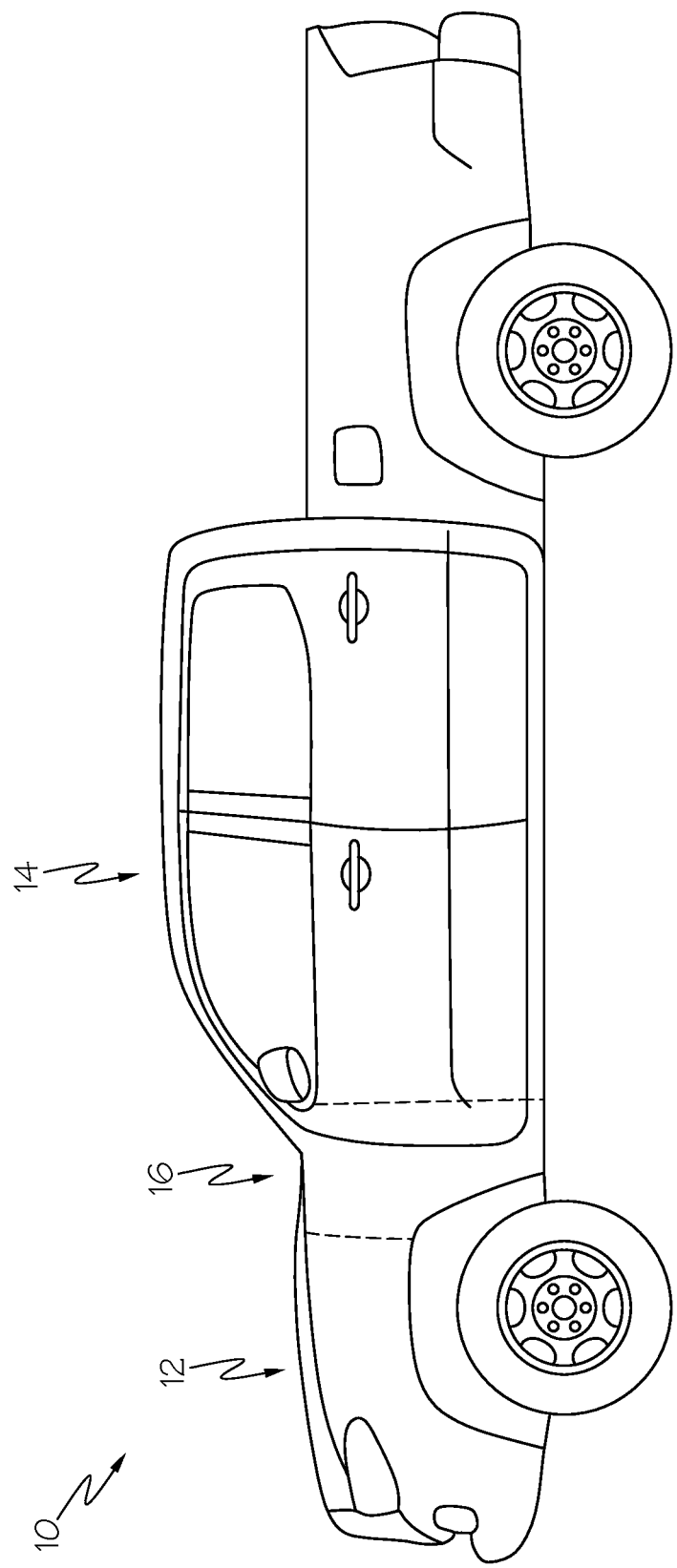
FIG. 1 depicts a vehicle, according to one or more embodiments shown and described herein.

FIG. 1 generally depicts an embodiment of a vehicle. A noted above, vehicles may include various ports or electrical connections that allow a user to electrically couple an accessory to a vehicle. Embodiments, of the present disclosure include programmable connection ports. These programmable connection ports may allow a user to define parameters around which the vehicle may selectively operate a programmable connection port. For example, the vehicle may include an electronic controller communicatively coupled to one or more programmable connection ports. The electronic controller may receive a user control signal from a user input device (e.g., a head unit of a vehicle and/or a remote device, such as a smartphone). Based on the user control signal, the electronic controller selectively operates the programmable connection port. In some embodiments, the user control signal may be indicative of a threshold of operation. Such threshold of operation may include, for example, a battery threshold (e.g., a battery level), a temperature threshold, a light threshold, a weight threshold, or any other environmental threshold as established with the user input device. Accordingly, a user may personalize operation of the programmable connection ports based on any number of preferences. These and additional embodiments will be described in more detail herein.

As used herein, the term "environment" may refer to any condition within or about the vehicle. For example, the term "environment" may refer to weather conditions, internal passenger compartment conditions, battery conditions, detected passenger weight conditions, light conditions, etc.

Referring now to FIG. 1, a vehicle 10 is depicted. It is noted that though the vehicle 10 is illustrated as a truck, the vehicle 10 may be any aquatic, land, or airborne vehicle. The vehicle 10 may define an engine compartment 12, a passenger compartment 14 and a dashboard 16 (or instrument panel), which separates that passenger compartment 14 from the engine compartment 12. It is noted that though the vehicle 10 is illustrated as having an engine compartment 12, the vehicle 10 may be an electric or hybrid vehicle. It is noted, that directional terms used herein e.g., forward, behind, above, below, refer to frames of references illustrated in the figures. Additionally, it is noted that when an item is described as "behind the dashboard" refers to any position which is opposite from the passenger compartment 14 across the dashboard 16, such that it may be hidden from view from passengers seated in the passenger compartment 14.

Figure 2:
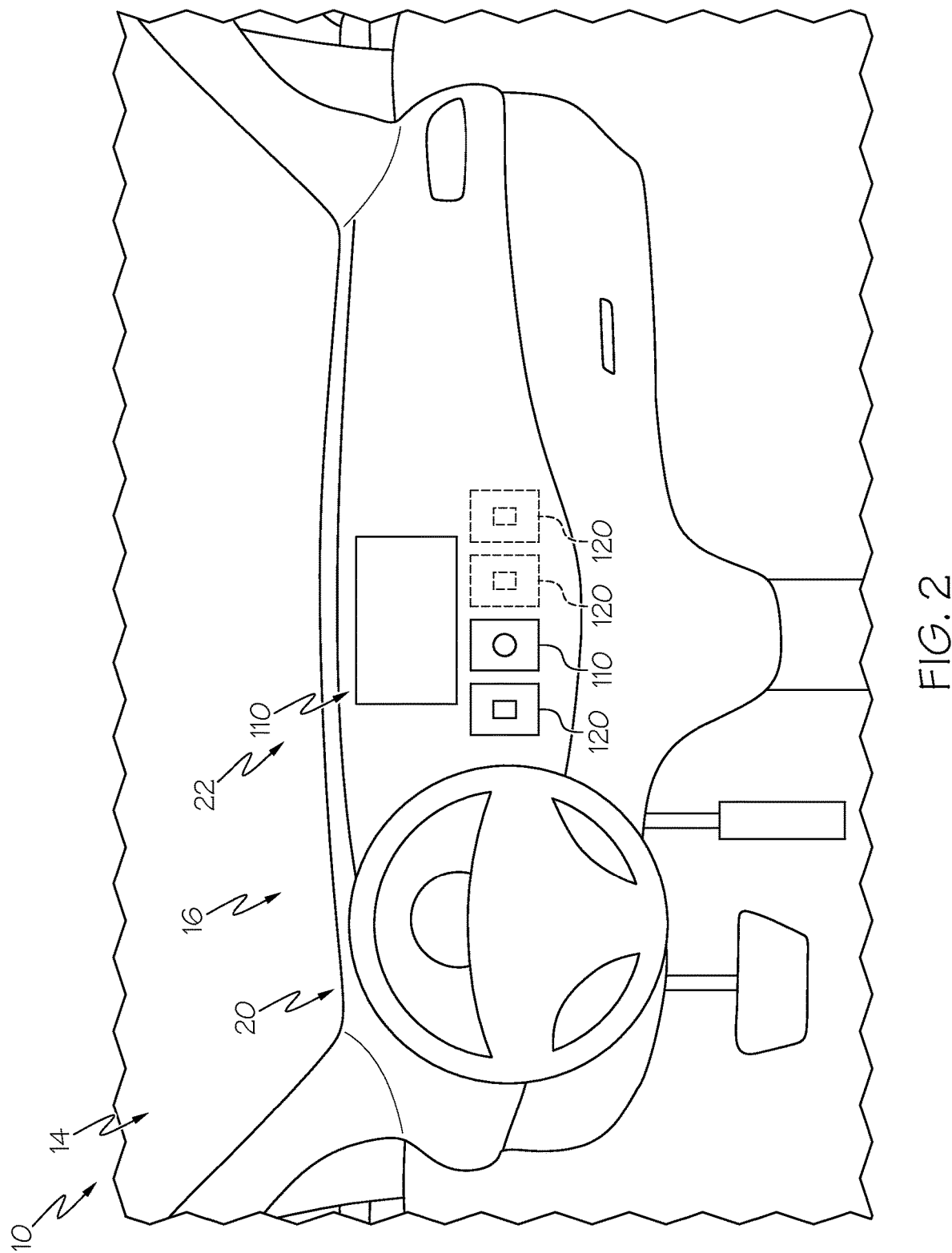
FIG. 2 depicts a dashboard of the vehicle of FIG. 1, according to one or more embodiments shown and described herein.

Referring now to FIG. 2, the dashboard 16 is generally depicted. The dashboard 16 may generally include vehicle navigation controls 20 (e.g., the steering wheel, pedals, gear shifter, etc.). Additionally, the dashboard 16 may include the head unit 22, which may include the vehicle user interface for controlling various vehicle, comfort, and entertainment settings. The head unit 22 may include one or more user input devices 110 (e.g., displays, buttons, switches, knobs, etc.) for interacting and controlling the various settings. The vehicle 10 may further include one or more programmable connection ports 120.

Figure 3:
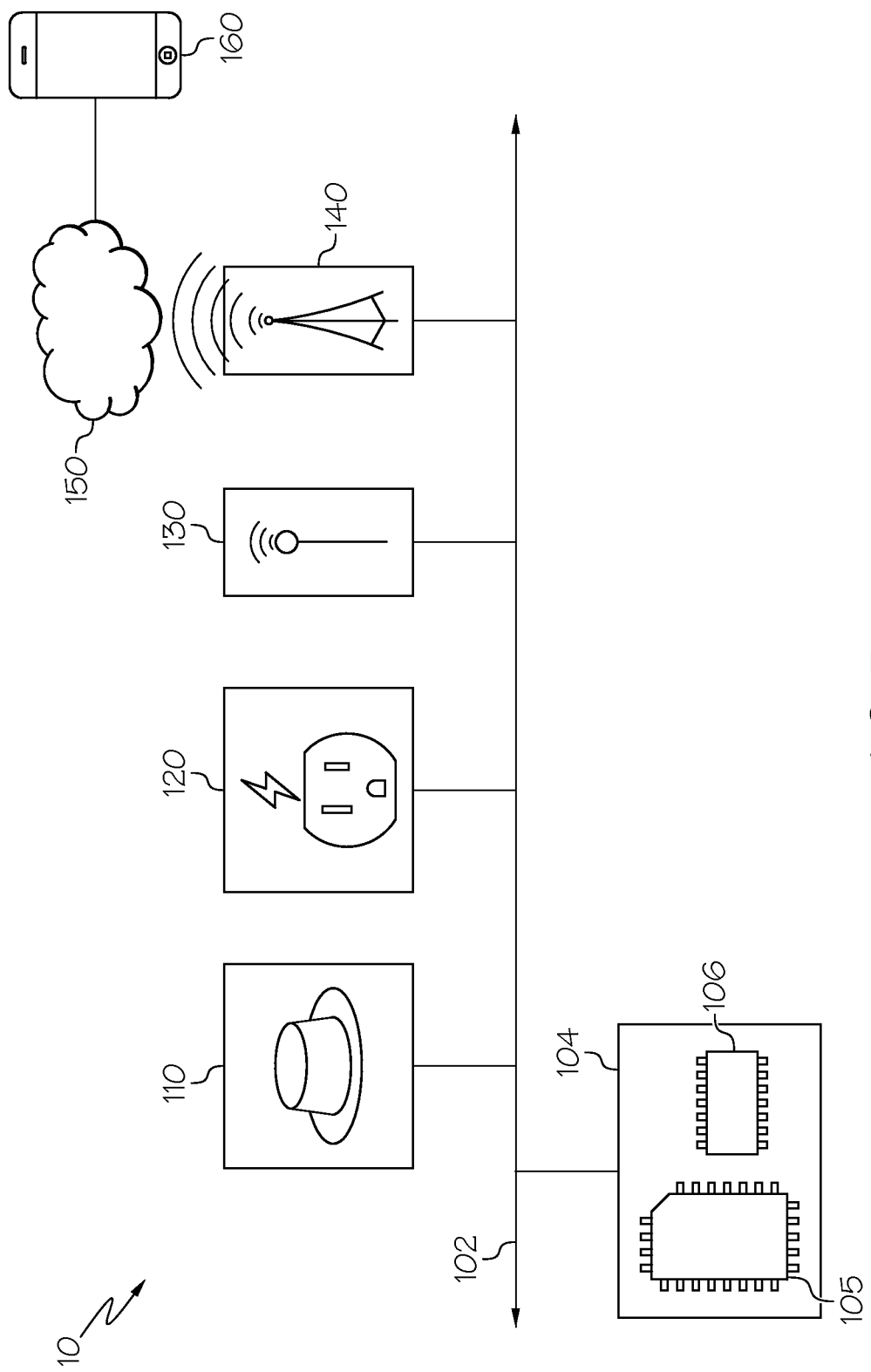
FIG. 3 schematically illustrates communicatively coupled modules of the vehicle of FIG. 1, according to one or more embodiments shown and described herein.

Referring now to FIG. 3, a schematic diagram illustrating communication between various components of the vehicle 10 is depicted. The vehicle 10 generally includes a communication path 102, an electronic controller 104, the one or more user input devices 110, and the one or more programmable connection ports 120. The vehicle 10 may further includes one or more sensors 130 and/or network interface hardware 140.

The communication path 102 that provides data interconnectivity between various modules disposed within the vehicle 10. Specifically, each of the modules can operate as a node that may send and/or receive data. In some embodiments, the communication path 102 includes a conductive material that permits the transmission of electrical data signals to processors, memories, sensors, and actuators throughout the vehicle 10. In another embodiment, the communication path 102 can be a bus, such as for example a LIN bus, a CAN bus, a VAN bus, and the like. In further embodiments, the communication path 102 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The electronic controller 104 is any type of control device, which is capable of selectively controlling operation of the one or more programmable connection ports 120. For example, the electronic controller 104 may include one or more processors 105 and one or more memory modules 106. The one or more processors 105 may include any device capable of executing machine-readable instructions stored on a non-transitory computer-readable medium. Accordingly, each processor 105 may include a controller, an integrated circuit, a microchip, a computer, and/or any other computing device.

The one or more memory modules 106 are communicatively coupled to the one or more processors 105 over the communication path 102. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle 10 and/or external to the vehicle 10. The one or more memory modules 106 may be configured to store one or more pieces of logic, as described in more detail below. The embodiments described herein may utilize a distributed computing arrangement to perform any portion of the logic described herein.

Embodiments of the present disclosure include logic stored on the one or more memory modules 106 that includes machine-readable instructions and/or an algorithm written in any programming language of any generation (e.g., 1GL, 2GL, 3GL, 4GL, and/or 5GL) such as, machine language that may be directly executed by the one or more processors 105, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic stored on the one or more memory modules 106 allows the electronic controller 104 to receive a user control signal from a user input device 110 and selective operate the one or more programmable connection ports 120 in response to the user control signal from the user input device 110. In some embodiments, the user control signal may be stored on the one or more memory modules 106 and maintained as standing control logic for the one or more programmable connection ports 120 unless otherwise altered by, for example, a subsequent user control signal.

Figure 4:
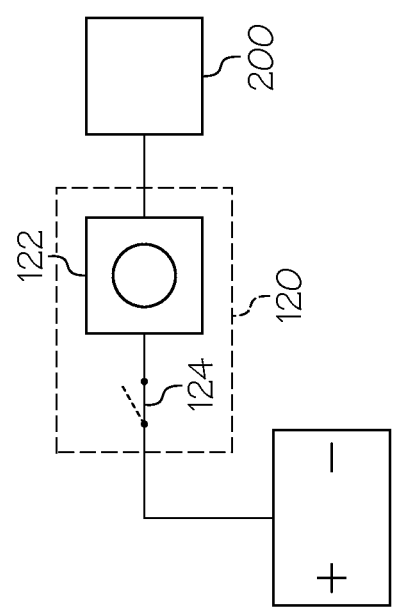
FIG. 4 schematically illustrates an accessory coupled to a battery of the vehicle of FIG. 1, according to one or more embodiments shown and described herein.

Referring now to FIG. 4, the one or more programmable connection ports 120 may include any access point 122 (e.g., a plug or terminal), which allows for an accessory 200 to be electrically coupled a battery 30 of the vehicle 10. The battery 30 may be any energy storage device that provides the vehicle 10 with electrical power. The battery 30 may be the primary vehicle power source or may be used in conjunction with another power source. Non-limiting examples of vehicle batteries include all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, etc.

An electrical lead 202 of the accessory 200 may be inserted or otherwise coupled to the one or more programmable connection ports 120 (e.g., at the access point 122) such that energy may flow from the battery 30 through the programmable connection port 120 to the accessory 200. In embodiments, the vehicle 10 may include a plurality of programmable connection ports 120, which may be mounted at various locations within the vehicle 10. Accordingly, each programmable connection port 120 electrically couples a different accessory 200 to the battery 30.

In some embodiments, the programmable connection port 120 may include an inverter (not shown). An inverter may be used to transform the electrical current from the battery 30 from a DC (current) to an AC (alternating current) if needed.

Referring again to FIG. 2, the one or more programmable connection ports 120 may be positioned within the passenger compartment 14 of the vehicle 10, for example, on the dashboard 16. Such port locations may be used for transient accessories, or ones, which are not typically permanently mounted to a vehicle 10. Such transient accessories may include, for example, phone chargers, auxiliary GPS units, etc. However, some accessories (e.g., refrigerators, auxiliary lights, speakers, etc.) it may be desirable to have more permanently mounted within the vehicle 10 such that the accessories may not be easily uncoupled from the battery 30 from a position within the passenger compartment 14. Accordingly, in some embodiments, one or more programmable connection ports 120 may be positioned behind the dashboard 16 and/or within the engine compartment 12, shown in FIG. 1. By placing the one or more programmable connection ports 120 behind the dashboard 16, the one or more programmable connection ports 120 may provide more permanent connections and keep excess, loose wires within the passenger compartment 14 to a minimum. In some embodiments, one or more programmable connection ports 120 may be within both interior of the passenger compartment 14 and also positioned behind the dashboard 16 and/or within the engine compartment 12. In some embodiments, one or more programmable connection ports 120 may be located on an exterior of the vehicle 10 and/or within a trunk or truck bed of the vehicle 10. Accordingly, the one or more programmable connection ports 120 may be located anywhere on or within the vehicle 10.

The one or more programmable connection ports 120 may be programmable in that that may be operated by the electronic controller 104 based on programmed logic (e.g., a CAN message) which may be set by a user using one or more user input devices 110. For example, and with reference to FIG. 4, each of the one or more programmable connection ports 120 may include the access point 122 for which to receive electrical connections from the accessory 200 and a switch 124. The switch 124 may be operated by the electronic controller 104 between an open and a closed position. When the switch 124 is closed, electrical energy may flow from the battery 30, through the programmable connection port 120 and to the accessory 200. However, when the switch 124 is open, electrical energy is prevented from flowing to the accessory 200. Accordingly, the electronic controller 104 may execute logic to selectively control power to the accessory 200, by controlling the switch 124 of each of the one or more programmable connection ports 120.

The user input device 110 is communicatively coupled to the electronic controller 104 over the communication path 102. The user input device 110 may be any type of hardware that allows a user to communicate commands, instructions, etc. to the electronic controller 104. The user input device 110 may include any number of buttons, switches, toggles, touchscreens, microphones, or the like. The user input device 110, or a user input device 110 of one or more user input devices 110, may be integrated into the head unit 22 of the vehicle 10, such as illustrated in FIG. 2. In some embodiments, the user input device 110 may include remote devices such as a user's smartphone, tablet, laptop, computer, or the like.

For example, and with reference to FIG. 3, the vehicle 10 may include network interface hardware 140 communicatively coupled to the electronic controller 104 over the communication path 102. The network interface hardware 140 may communicatively couple the vehicle 10 with a network 150. The network interface hardware 140 can be any device capable of transmitting and/or receiving data via the network 150. Accordingly, the network interface hardware 140 can include a communication transceiver for sending and/or receiving any wired or wireless communication. For example, the network interface hardware 140 may include an antenna, a modem, LAN port, Wi-Fi card, WiMax card, mobile communications hardware, near-field communication hardware, satellite communication hardware, and/or any wired or wireless hardware for communicating with or through other networks.

In one embodiment, the network 150 is a personal area network 150 that utilizes Bluetooth technology to communicatively couple the electronic controller 104 and a remote device 160 (e.g., smart phone, laptop, tablet, etc.). In other embodiments, the network 150 may include one or more computer networks (e.g., a personal area network, a local area network, or a wide area network), cellular networks, satellite networks and/or a global positioning system, and combinations thereof. Accordingly, the electronic controller 104 can be communicatively coupled to the network 150 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As noted above, in some embodiments, the network interface hardware 140 may include hardware configured to operate in accordance with the Bluetooth wireless communication protocol. In another embodiment, network interface hardware 140 may include a Bluetooth send/receive module for sending and receiving Bluetooth communications to/from a remote device 160. For example, the network interface hardware 140 may communicate with a remote device 160 (e.g., a smart phone, tablet, etc. within the vehicle 10) such that the remote device 160 may communicate user inputs received on the remote device 160 to provide instructions as to operation of the one or more programmable connection ports 120.

Using a user input device 110 (e.g., either a user input device associated with the vehicle 10 and/or the remote device 160), the user may communicate a user control signal to the electronic controller 104. The electronic controller 104 receives the user control signal from the user input device 110 and selectively operates the one or more programmable connection ports 120 in response to the user control signal. For example, the user control signal may be indicative of some threshold of operation. For example, a threshold of operation may refer to certain conditions under which a programmable connection port 120 allows an accessory 200 to receive power from the battery 30. Such thresholds of operation may refer to, for example, periods of time, users present, weather conditions, locations, whether a vehicle 10 is driving, battery 30 level conditions, light conditions, headlamp status, security status, key present, etc. These set thresholds of operation may cause the electronic controller 104 to operate the switch 124 of the one or more programmable connection ports 120 to turn accessories on and/or off. Additionally, the user input device 110 may further allow a user to simply turn each of the one or more programmable connection ports 120, and therefore the attached accessory 200, off and/or on as desired.

Referring again to FIG. 3, and as noted above, the vehicle 10 may include one or more sensors 130 configured to output an environment signal indicative of an environment of the vehicle 10. The one or more sensors 130 may be part of the vehicle 10 or may be part of some remote device 160 communicatively coupled to the electronic controller 104 by the network interface hardware 140. The one or more sensors 130 may include, for example and not as a limitation, temperature sensors, battery sensors, seat weight sensors, and lights sensors, etc. In some embodiments, the one or more sensors 130 could also include key presence sensors, timers, cameras, GPS sensors, weather sensors, or the like. In response to receiving the environment signal, the electronic controller 104 may operate the one or more programmable connection ports 120 in response to the environment signal and/or the user control signal.

The following examples are non-limiting examples of various thresholds that may be set by a user using the user input device 110.

In a first example, the one or more sensors 130 may include a temperature sensor, wherein the electronic controller 104 operates a programmable connection port 120 based on a temperature threshold of operation indicated by the user control signal. For example, it may be desirable that some accessories only operate during certain temperature conditions. For example, the temperature sensor may output an environment signal indicative of a temperature of the environment of the vehicle 10 (e.g., an interior temperature and/or an exterior temperature). An accessory 200 such as a refrigerator, for example, may not need to, or it may be undesirable for it to draw power from the battery 30 when an environment of a vehicle 10 (such as an interior of the vehicle 10) is below a predetermined temperature. A user, using the user input device 110 may set a threshold temperature at which the particular programmable connection port 120 to which the refrigerator is connected allows power from the battery 30 to flow therethrough. For example, where the environment is greater than 60° F., greater than 50° F., or other defined threshold, the electronic controller 104 may turn the switch 124 of the programmable connection port 120 to the closed position to allow power from the battery 30 to be drawn by the refrigerator. Similarly, wherein the environment is less than about 50° F., less than about 40° F., or other defined threshold, the electronic controller 104 may turn the switch 124 to the open position to prevent power being drawn by the refrigerator, which may preserve battery power. Other example accessories under which it may be desirable to have temperature threshold setting may include for example, an auxiliary heater or heated seat cover.

In another example, the one or more sensors 130 may include a battery sensor, wherein the electronic controller 104 operates a programmable connection port 120 based on a battery threshold of operation indicated by the user control signal. For example, some accessories may only be operated so long as the battery 30 has sufficient capacity. Such threshold preferences may be set by the user using the one or more user input devices 110. For example, the user may prioritize different accessories by prioritizing the various programmable connections ports to which the accessories are coupled. For example, an accessory coupled to a first programmable connection port may have a lower battery power threshold (e.g., 30% battery life) than a second programmable connection port (e.g., 50% battery life) depending on which accessory the user would like to prioritize.

In another example, the one or more sensors 130 may include weight sensors, wherein the electronic controller 104 operates a programmable connection port 120 based on a weight threshold of operation as indicated by the user control signal. For example, some accessories may only be operated (e.g., power is supplied to an accessory 200 through the programmable connection port 120) when a user who would have access to the accessory 200 reaches a predetermined weight threshold. That is, some accessories may be prevented from being used when it is determined that a child, based on weight, is sitting in a seat that would have access to the accessory 200 (e.g., a refrigerator, a CB radio, grill, auxiliary touch screen, etc.). In some embodiments, the electronic controller 104 may be communicatively coupled to the accessory 200 so as to control various operations of the accessory 200, so as to be able to lock access to an accessory 200 (such as by operating a lock on a refrigerator).

In yet another example, the one or more sensors 130 may include a light sensor, wherein the electronic controller 104 operates a programmable connection port 120 based on a light threshold of operation indicated by the user control signal. For example, the light sensor may output a signal indicative of an environmental level of light. It may be desirable that certain accessories be operated once a desired lighting level is reached. For example, when daylight starts to fade to twilight or light levels are below a desired level, it may be desirable that any auxiliary lights added to the vehicle 10 be operated. Desired levels may be based on percentages of maximum daylight (e.g., cloudless sky when sun is at peak), such threshold percentages may be 50% maximum daylight, 40% maximum daylight, 30% maximum daylight, or any other chosen level.

In yet another example, the one or more sensors 130 may include a tire pressure sensor, wherein the electronic controller 104 operates a programmable connection port 120 based on a tire pressure threshold of operation indicated by the user control signal. For example, an accessory 200 coupled to the battery 30 through a programmable connection port 120 may be an air compressor. Until tire pressure(s) fall below a desired level, the electronic controller 104 may prevent the flow of power to the air compressor. In some embodiments, the electronic controller 104 may automatically operate the air compressor when it is determined, based on the tire pressure signal, that the tire pressure has fallen below a predetermined level to re-inflate the tire(s).

In yet another example, the one or more sensors 130 may include a gear selection sensor, wherein the electronic controller 104 operates a programmable connection port 120 based on some operation threshold of the vehicle 10 indicated by through user control signal. For example, the gear selection sensor may detect which gear the vehicle 10 has been placed (e.g., drive, reverse, neutral, etc.). Based on the user control signal the electronic controller 104 may prevent operation of some accessories depending on which gear the vehicle 10 is placed or may only allow operations of some accessories when the vehicle 10 is placed in the appropriate gear. For example, an auxiliary screen may be prevented from operating (e.g., the switch 124 is moved to the open position of the programmable connection port 120) when the vehicle 10 is placed in a driving (e.g., non-stationary) gear.

Figure 5:
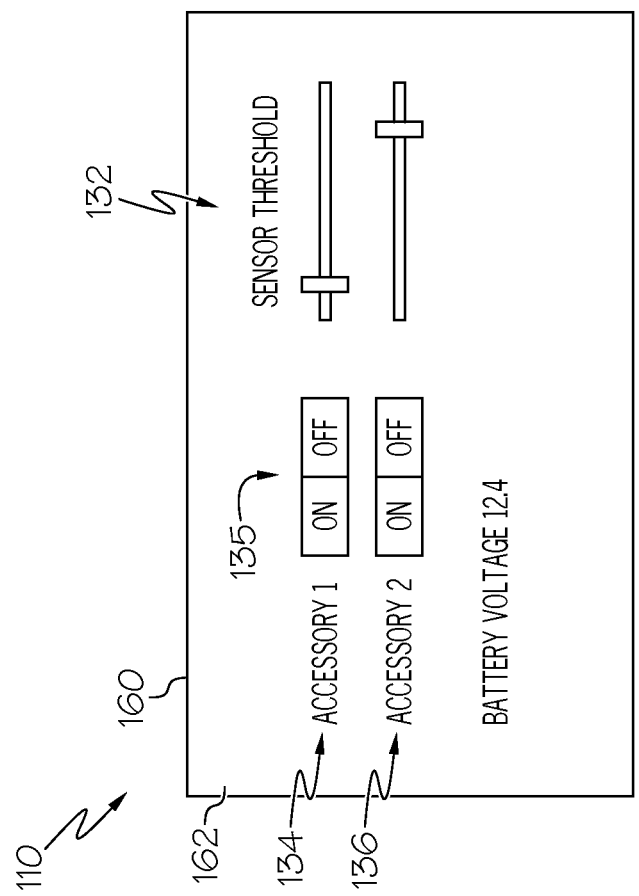
FIG. 5 depicts a user input device, according to one or more embodiments shown and described herein.

These examples, provide just a few of the possible threshold settings, which may be set by user using a user input device 110. However, other types and combinations of sensors and accessories are contemplated and possible FIG. 5 illustrates a user input device 110 such as a remote device 160, which may be used to set the various thresholds of the one or more programmable connection ports 120, such as described above. For example, the user input device 110 may include a display 162, which displays a menu for adjusting the various thresholds of the one or more programmable connection ports 120, or operating the one or more programmable connection ports 120. For example, the one or more programmable connection ports 120 may be displayed and assigned to an accessory to which they are attached. For example, a user may input that a first programmable connection port is corresponds to a first accessory 134 and a second programmable connection port is corresponds to a second accessory 136. The first and second accessories 134, 136 may be any type of accessories (e.g., additional driving lights, other auxiliary lights, CB radios, fridges, power tool chargers, water coolers, grilles, boom boxes, air compressors, etc.). It is noted that only two accessories are listed corresponding to two programmable connection ports, a greater or fewer number of programmable connection ports, and accessories, may be included without departing from the scope of the present disclosure.

The display 162, which may include a touchscreen display, may include buttons 135, for example, that allow the user to turn on and/or off an accessory 200 with the user input device 110, as desired. It is noted that, in some embodiments, the one or more accessories may be used whether or not the vehicle 10 itself is running. That is, operation of the electronic controller 104 and the one or more programmable connection ports 120 may be controlled when the vehicle 10 is off. For example, the one or more programmable connection ports 120 may be "always on" in that they may be used or placed into operation without the vehicle 10 being switched on using a key to the vehicle 10.

The user, using the user input device 110, may define a user control signal for each of the one or more programmable connection ports 120, such that each programmable connection port 120 may be operated based on a particular threshold (or multiple thresholds) assigned by the user with the user input device 110. Stated another way, the user may define some level of sensitivity that the one or more programmable connection ports 120 operate, thereby controlling when and under what circumstances an accessory 200 becomes operational. For example, the user input device 110 may include an operation threshold menu 132 which may allow a user to assign and/or adjust operation thresholds. For example, the operation threshold menu 132 may allow a user to associate the one or more sensors 130 or other factors with the one or more programmable connection ports 120. That is, the user may tie sensor data associated with a particular type of accessory or other types of preferences to the programmable connection port 120 coupled with that accessory so as to define when that particularly accessory is operated. In some embodiments, the user may select multiple operation thresholds for a single programmable connection port. It is noted that while the operation threshold menu 132 is illustrated by a sliding scale, other representations may be used to indicate a threshold level (e.g., a numeric threshold).

In some embodiments, the user input device 110 may provide additional information on the display 162, which may be useful to the user. For example, the user input device 110 may provide information such as remaining battery power, temperature, light levels, security status, headlamp status, key presence, tire inflation status, or the like. That is, relevant data from the one or more sensors 130 may be displayed to a user, which may allow a user to dynamically determine and, perhaps, change desired threshold settings.

It should be understood now that embodiments provided herein are directed to programmable connection ports that allow a user to define parameters around which the vehicle may selectively operate a programmable connection port. For example, the vehicle includes an electronic controller communicatively coupled to one or more programmable connection ports. The electronic controller may receive a user control signal from a user input device (e.g., a head unit of a vehicle and/or a remote device). Based on the user control signal, the electronic controller selectively operates the programmable connection port. In some embodiments, the user control signal may be indicative of a threshold of operation. Such threshold of operation may include, for example a battery threshold (e.g., a battery level), a temperature threshold, a light threshold, a weight threshold, or any other environmental threshold as established with the user input device. Accordingly, a user may personalize operation of the programmable connection ports based on any number of preferences.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a battery;
one or more programmable connection ports electrically coupled to the battery; and
an electronic controller communicatively coupled to the one or more programmable connection ports that:
receives a user control signal from a user input device communicatively coupled to the electronic controller, wherein the user control signal indicates a threshold of operation; and
selectively operates the one or more programmable connection ports in response to the threshold of operation indicated by the user control signal from the user input device wherein
the electronic controller is configured to set a priority of a first programmable connection port relative to a second programmable connection port in response to the user control signal user input.

2. The vehicle of claim 1, further comprising:
one or more sensors that output an environment signal indicative of an environment of the vehicle, wherein the electronic controller:
receives the environment signal and operates the one or more programmable connection ports in response to the environment signal and the user control signal.

3. The vehicle of claim 2, wherein the one or more sensors comprise a temperature sensor, wherein the electronic controller operates a programmable connection port based on a temperature threshold of operation indicated by the user control signal.

4. The vehicle of claim 2, wherein the one or more sensors comprise a battery sensor, wherein the electronic controller operates a programmable connection port based on a battery threshold of operation indicated by the user control signal.

5. The vehicle of claim 2, wherein the one or more sensors comprise a seat weight sensors, wherein the electronic controller operates a programmable connection port based on a weight threshold of operation indicated by the user control signal.

6. The vehicle of claim 2, wherein the one or more sensors comprise a light sensor, wherein the electronic controller operates a programmable connection port based on a light threshold of operation indicated by the user control signal.

7. The vehicle of claim 1, further comprising network interface hardware communicatively coupled to the electronic controller, and the user input device includes a mobile device communicating to the electronic controller through the network interface hardware.

8. A vehicle comprising:
a dashboard separating a passenger compartment from an engine compartment of the vehicle;
a battery;
one or more programmable connection ports electrically coupled to the battery, wherein at least a portion of the one or more programmable connection ports are located behind the dashboard; and
an electronic controller communicatively coupled to the one or more programmable connection ports that:
receives a user control signal from a remote device communicatively coupled to the electronic controller; and selectively operates the one or more programmable connection ports in response to the user control signal from the remote device, wherein the electronic controller is configured to set a priority of a first programmable connection port relative to a second programmable connection port in response to the user control signal user input.

9. The vehicle of claim 8, further comprising:

one or more sensors that output an environment signal indicative of an environment of the vehicle, wherein the electronic controller:

receives the environment signal and operates the one or more programmable connection ports in response to the environment signal.

10. The vehicle of claim 9, wherein the one or more sensors comprise a temperature sensor, wherein the electronic controller operates a programmable connection port based on a temperature threshold of operation.

11. The vehicle of claim 9, wherein the one or more sensors comprise a battery sensor, wherein the electronic controller operates a programmable connection port based on a battery threshold of operation.

12. The vehicle of claim 9, wherein the one or more sensors comprise a seat weight sensors, wherein the electronic controller operates a programmable connection port based on a weight threshold of operation.

13. The vehicle of claim 9, wherein the one or more sensors comprise a light sensor, wherein the electronic controller operates a programmable connection port based on a light threshold of operation.

\* \* \* \* \*